United States Patent
Chen et al.

(10) Patent No.: US 12,126,518 B2
(45) Date of Patent: Oct. 22, 2024

(54) INTERIOR GATEWAY PROTOCOL (IGP) FOR SEGMENT ROUTING (SR) PROXY SEGMENT IDENTIFIERS (SIDS)

(71) Applicant: Huawei Technologies Co., Ltd., Shenzhen (CN)

(72) Inventors: Huaimo Chen, Bolton, MA (US); Zhibo Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/981,247

(22) Filed: Nov. 4, 2022

(65) Prior Publication Data

US 2023/0055501 A1    Feb. 23, 2023

Related U.S. Application Data

(63) Continuation of application No. 17/035,228, filed on Sep. 28, 2020, now Pat. No. 11,516,111, which is a
(Continued)

(51) Int. Cl.
    *H04L 45/02*    (2022.01)
    *H04L 45/50*    (2022.01)
    (Continued)

(52) U.S. Cl.
    CPC .............. *H04L 45/02* (2013.01); *H04L 45/04* (2013.01); *H04L 45/50* (2013.01); *H04L 47/2441* (2013.01); *H04L 67/56* (2022.05)

(58) Field of Classification Search
    CPC ......... H04L 45/02; H04L 67/56; H04L 45/04; H04L 45/50; H04L 47/2441
    See application file for complete search history.

(56) References Cited

U.S. PATENT DOCUMENTS 9,537,718 B2    1/2017  Bashandy et al.
9,584,404 B2 *  2/2017  Atlas ...................... H04L 45/00
                        (Continued)

OTHER PUBLICATIONS

Hu, Z., et al., "Segment Routing Proxy Forwarding," draft-hu-spring-segment-routing-proxy-forwarding-00, Oct. 22, 2018, 17 pages.
(Continued)

*Primary Examiner* — Glenton B Burgess
*Assistant Examiner* — Jihad K Boustany
(74) *Attorney, Agent, or Firm* — Conley Rose, P.C.

(57) ABSTRACT

A Proxy Forwarding node configured to advertise Segment Routing (SR) proxy forwarding capability of the Proxy Forwarding node for neighboring nodes of the Proxy Forwarding node using extensions to interior gateway protocol (IGP) for Proxy Forwarding for enabling an ingress node to the SR Traffic Engineering (SR-TE) path to continue to forward the traffic without modifying a segment list of the SR-TE path that includes a node segment identifier (SID) of a failed neighboring node of the Proxy Forwarding node. When the Proxy Forwarding node receives traffic targeting the failed neighboring node, the Proxy Forwarding node performs SR proxy forwarding for the failed neighboring
(Continued)

node by forwarding the traffic towards a destination of the traffic in a direction that avoids the failed neighboring node for a period of time after the IGP has converged.

18 Claims, 12 Drawing Sheets

Related U.S. Application Data continuation of application No. PCT/US2019/067366, filed on Dec. 19, 2019.

(60) Provisional application No. 62/784,042, filed on Dec. 21, 2018.

(51) Int. Cl.
*H04L 47/2441* (2022.01)
*H04L 67/56* (2022.01)

(56) References Cited

U.S. PATENT DOCUMENTS

| | | | | |
|---|---|---|---|---|
| 9,838,246 | B1* | 12/2017 | Hegde | H04L 45/18 |
| 10,917,330 | B1 | 2/2021 | Szarecki et al. | |
| 11,184,276 | B1 | 11/2021 | Boutros et al. | |
| 2015/0146531 | A1* | 5/2015 | Welin | H04L 45/74 370/235 |
| 2016/0173366 | A1 | 6/2016 | Saad et al. | |
| 2020/0127913 | A1* | 4/2020 | Filsfils | H04L 45/741 |
| 2020/0213223 | A1* | 7/2020 | Peng | H04L 47/72 |
| 2020/0287824 | A1* | 9/2020 | Dutta | H04L 45/20 |
| 2021/0083975 | A1* | 3/2021 | Chunduri | H04L 45/121 |

OTHER PUBLICATIONS

Bashandy, et al., "Topology Independent Fast Reroute using Segment Routing," draft-bashandy-rtgwg-segment-routing-ti-lfa-05, Oct. 4, 2018, 19 pages.
Hegde, et al., "Node Protection for SR-TE Paths," draft-hegde-spring-node-protection-for-sr-te-paths-05, Jul. 5, 2019, 13 pages.
Previdi, Ed., et al., "IS-IS Extensions for Segment Routing," draft-ietf-isis-segment-routing-extensions-25, May 19, 2019, 32 pages.
Psenak, Ed., et al., "OSPF Extensions for Segment Routing," draft-ietf-ospf-segment-routing-extensions-27, Dec. 3, 2018, 29 pages.
Filsfils, et al., "Segment Routing Policy Architecture," draft-ietf-spring-segment-routing-policy-03.txt, May 12, 2019, 33 pages.
Sivabalan, et al., "Carrying Binding Label/Segment-ID in PCE-based Networks," draft-sivabalan-pce-binding-label-sid-07, Jul. 8, 2019, 16 pages.
Bradner, "Key words for use in RFCs to Indicate Requirement Levels," RFC 2119, Mar. 1997, 3 pages.
Andersson, "Multiprotocol Label Switching (MPLS) Label Stack Entry: "EXP" Field Renamed to "Traffic Class" Field," RFC 5462, Feb. 2009, 9 pages.
Ginsberg, et al., "IS-IS Flooding Scope Link State PDUs (LSPs)," RFC 7356, Sep. 2014, 23 pages.
Lindem, Ed., et al., "Extensions to OSPF for Advertising Optional Router Capabilities," RFC 7770, Feb. 2016, 15 pages.
Psenak, P., et al., "Multi-Topology (MT) Routing in OSPF," Network Working Group, RFC 4915, Jun. 2007, 20 pages.

* cited by examiner

```
    0                   1                   2                             4
    0 1 2 4 4 5 6 7 8 9 0 1 2 4 4 5 6 7 8 9 0 1 2 4 4 5 6 7 8 9 0 1
   +-+-+-+-+-+-+-+-+-+-+-+-+-+-+-+-+-+-+-+-+-+-+-+-+-+-+-+-+-+-+-+-+
   |            Type  402          |          Length  404          |
   +-+-+-+-+-+-+-+-+-+-+-+-+-+-+-+-+-+-+-+-+-+-+-+-+-+-+-+-+-+-+-+-+
   |                                                               |
   |                    SID sub-TLVs    406                        |
   |                                                               |
   +-+-+-+-+-+-+-+-+-+-+-+-+-+-+-+-+-+-+-+-+-+-+-+-+-+-+-+-+-+-+-+-+

Proxy SIDs TLV
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type  502             |          Length  504          |
+-+-+-+-+-+-+-+-+-+-+-+-+-+-+-+-+-+-+-+-+-+-+-+-+-+-+-+-+-+-+-+-+
|   Flags 506   |   Reserved 508|    MT-ID  510 |  Algorithm 512|
+-+-+-+-+-+-+-+-+-+-+-+-+-+-+-+-+-+-+-+-+-+-+-+-+-+-+-+-+-+-+-+-+
| SID/Index/Label (variable)  514                               |
+-+-+-+-+-+-+-+-+-+-+-+-+-+-+-+-+-+-+-+-+-+-+-+-+-+-+-+-+-+-+-+-+

SID sub-TLV
```

```
    0                   1                   2                   3
    0 1 2 3 4 6 6 6 8 9 0 1 2 3 4 6 6 6 8 9 0 1 2 3 4 6 6 6 8 9 0 1
   +-+-+-+-+-+-+-+-+-+-+-+-+-+-+-+-+
   |     Type 602    |   Length 604  |
   +-+-+-+-+-+-+-+-+-+-+-+-+-+-+-+-+-+-+-+-+-+-+-+-+-+-+-+-+-+-+-+-+
   | SID/Index/Label (variable) 606                                |
   +-+-+-+-+-+-+-+-+-+-+-+-+-+-+-+-+-+-+-+-+-+-+-+-+-+-+-+-+-+-+-+-+

SID sub-TLV
```

0                   1                   2                   3
 0 1 2 3 4 6 6 7 8 9 0 1 2 3 4 6 6 7 8 9 0 1 2 3 4 6 6 7 8 9 0 1
+-+-+-+-+-+-+-+-+-+-+-+-+-+-+-+-+-+-+-+-+-+-+-+-+-+-+-+-+-+-+-+-+
|           LS age 702          |   Options 704 |  LS Type  706 |
+-+-+-+-+-+-+-+-+-+-+-+-+-+-+-+-+-+-+-+-+-+-+-+-+-+-+-+-+-+-+-+-+
| Opaque Type(7)|                Opaque ID 710                  |
      708
+-+-+-+-+-+-+-+-+-+-+-+-+-+-+-+-+-+-+-+-+-+-+-+-+-+-+-+-+-+-+-+-+
|                    Advertising Router 712                     |
+-+-+-+-+-+-+-+-+-+-+-+-+-+-+-+-+-+-+-+-+-+-+-+-+-+-+-+-+-+-+-+-+
|                    LS sequence number 714                     |
+-+-+-+-+-+-+-+-+-+-+-+-+-+-+-+-+-+-+-+-+-+-+-+-+-+-+-+-+-+-+-+-+
|       LS checksum  716        |           Length  718         |
+-+-+-+-+-+-+-+-+-+-+-+-+-+-+-+-+-+-+-+-+-+-+-+-+-+-+-+-+-+-+-+-+
|                                                               |
+                            TLVs            720                +
|                  (including Proxy SIDs TLV)                   |
|                                                               |
+-+-+-+-+-+-+-+-+-+-+-+-+-+-+-+-+-+-+-+-+-+-+-+-+-+-+-+-+-+-+-+-+

OSPFv2 Extended Prefix Opaque LSA
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type 902       |     Length 904    |     Flags 906         |
+-+-+-+-+-+-+-+-+-+-+-+-+-+-+-+-+-+-+-+-+-+-+-+-+-+-+-+-+-+-+-+-+
|                        Range 908                               |
+-+-+-+-+-+-+-+-+-+-+-+-+-+-+-+-+-+-+-+-+-+-+-+-+-+-+-+-+-+-+-+-+
//              SID/Label Sub-TLV (variable) 910               //
+-+-+-+-+-+-+-+-+-+-+-+-+-+-+-+-+-+-+-+-+-+-+-+-+-+-+-+-+-+-+-+-+

SR Capabilities sub-TLV
```

```
 0  1  2  3  4  5  6  7
+--+--+--+--+--+--+--+--+
| I| V|PF|                |
+--+--+--+--+--+--+--+--+
              Flags
```
1002 1004 1006

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type 1102         |           Length 1104         |
+-+-+-+-+-+-+-+-+-+-+-+-+-+-+-+-+-+-+-+-+-+-+-+-+-+-+-+-+-+-+-+-+
~                    Binding SID TLV 1106                       ~
+-+-+-+-+-+-+-+-+-+-+-+-+-+-+-+-+-+-+-+-+-+-+-+-+-+-+-+-+-+-+-+-+
~                     SID sub-TLVs 1108                         ~
+-+-+-+-+-+-+-+-+-+-+-+-+-+-+-+-+-+-+-+-+-+-+-+-+-+-+-+-+-+-+-+-+

SR Binding TLV
```

*FIG. 11*

INTERIOR GATEWAY PROTOCOL (IGP) FOR SEGMENT ROUTING (SR) PROXY SEGMENT IDENTIFIERS (SIDS)

CROSS-REFERENCE TO RELATED APPLICATIONS

This application is a continuation of U.S. patent application Ser. No. 17/035,228, filed on Sep. 28, 2020, by Huawei Technologies Co., Ltd., and titled "Interior Gateway Protocol (IGP) For Segment Routing (SR) Proxy Segment Identifiers (SIDS)," which claims the benefit of International Application No. PCT/US2019/067366 filed on Dec. 19, 2019, by Futurewei Technologies, Inc., and titled "Interior Gateway Protocol (IGP) For Segment Routing (SR) Proxy Segment Identifiers (SIDS)," which claims the benefit of U.S. provisional patent application No. 62/784,042 filed Dec. 21, 2018, by Huaimo Chen et al., and titled "IGP For SR Proxy SIDS." The aforementioned applications are incorporated by reference in their entireties.

TECHNICAL FIELD

The present application relates to network communication, and more specifically to protecting Segment Routing (SR) tunnel/path against a node failure.

BACKGROUND

Segment Routing Traffic Engineering (SR-TE) is a technology that implements traffic engineering using Segment Routing. SR-TE supports the creation of explicit paths using segment lists containing adjacency-segment identifiers (SIDs), node-SIDs, anycast-SIDs, and binding-SIDs. A node-SID in the segment list defining an SR-TE path indicates a loose hop that the SR-TE path should pass through. When the segment list defining an SR-TE path contains a node-SID, and the node fails, the network may no longer be able to properly forward traffic on that SR-TE path. Several mechanisms have been proposed that allow local repair actions on the direct neighbors of the failed node to temporarily route traffic to the node immediately following the failed node on the SR-TE path segment list. However, once the Interior Gateway Protocol (IGP) shortest paths have converged, the local repair mechanism is no longer sufficient to continue forwarding traffic using the original segment list of the SR-TE path because the non-neighbors of the failed node will no longer have a route to reach the failed node.

The present disclosure recognizes that it would be useful to be able to continue to send traffic on an SR-TE path that uses the node-SID of the failed node for an extended period of time, without having to immediately modify the segment list used at the ingress to the SR-TE path. Accordingly, the present disclosure describes various embodiments that allow traffic to continue to be forwarded on an SR-TE path for an extended period of time after the failure of a node used in the path's segment list.

SUMMARY

A first aspect relates to a computer-implemented method for enabling traffic to continue to be forwarded on a Segment Routing Traffic Engineering (SR-TE) path for an extended period of time after a failure of a node along the SR-TE path. The method advertises SR proxy forwarding capability of the Proxy Forwarding node for neighboring nodes of the Proxy Forwarding node using extensions to interior gateway protocol (IGP) for Proxy Forwarding for enabling an ingress node to the SR-TE path to continue to forward the traffic without modifying a segment list of the SR-TE path that includes a node segment identifier (SID) of a failed neighboring node of the Proxy Forwarding node. The method receives traffic targeting a neighboring node of the Proxy Forwarding node. The traffic includes a proxy node-SID of the neighboring node when the neighboring node fails. The method performs SR proxy forwarding for the failed neighboring node by forwarding the traffic towards a destination of the traffic in a direction that avoids the failed neighboring node for a period of time after the IGP has converged.

A second aspect relates to a Proxy Forwarding node configured to enable traffic to continue to be forwarded on a Segment Routing Traffic Engineering (SR-TE) path for an extended period of time after a failure of a node whose node segment identifier (SID) is in a segment list of the SR-TE paths without having to immediately modify the segment list used at an ingress node to the SR-TE path. The Proxy Forwarding node includes a memory storing instructions, and a processor coupled to the memory, the processor configured to execute the instructions to cause the Proxy Forwarding node to advertise the SR proxy forwarding capability of the Proxy Forwarding node for neighboring nodes of the Proxy Forwarding node using extensions to interior gateway protocol (IGP) for Proxy Forwarding. The Proxy Forwarding node is configured to receive traffic targeting a neighboring node of the Proxy Forwarding node, the traffic utilizing a proxy node-SID of the neighboring node when the neighboring node fails. The Proxy Forwarding node is configured to perform SR proxy forwarding for the neighboring node by forwarding the traffic to a destination of the traffic without going through the neighboring node for the extended period of time after the IGP has converged.

In a first implementation form of the computer-implemented method or the Proxy Forwarding node according to the first or second aspect, when the Proxy Forwarding node supports SR proxy forwarding for all of its neighboring nodes, the Proxy Forwarding node advertises its SR proxy forwarding capability in an OSPF Router Information Opaque LSA that includes a Router Functional Capabilities TLV.

In a second implementation form of the computer-implemented method or the Proxy Forwarding node according to the first or second aspect, when the Proxy Forwarding node supports SR proxy forwarding for only some of its neighboring nodes, the Proxy Forwarding node advertises its SR proxy forwarding capability in an Open Shortest Path First (OSPF) Extended Prefix Opaque Link State Advertisement (LSA) that includes a Proxy SIDs Type Length Value (TLV) specifying the proxy node-SID of each of the neighboring nodes that the node P supports SR proxy forwarding.

In a third implementation form of the computer-implemented method or the Proxy Forwarding node according to the first or second aspect, the Proxy Forwarding node is further configured to create corresponding proxy forwarding entries for protecting the failure of the neighboring nodes that the Proxy Forwarding node supports SR proxy forwarding; maintain the OSPF Extended Prefix Opaque LSA that includes the Proxy SIDs TLV specifying the proxy node-SID of each of the neighboring nodes that the Proxy Forwarding node supports SR proxy forwarding for the extended period of time when a neighboring node fails; remove the Proxy SIDs TLV specifying the proxy node-SID of the neighboring node that failed from the OSPF Extended Prefix Opaque LSA after the extended period of time has elapsed; and remove the corresponding proxy forwarding entries for protecting the failure of the neighboring node after the extended period of time has elapsed.

In a fourth implementation form of the computer-implemented method or the Proxy Forwarding node according to the first or second aspect, when the Proxy Forwarding node supports SR proxy forwarding for all of its neighboring nodes, the Proxy Forwarding node advertises its SR proxy forwarding capability in its link state packet (LSP), which contains an Intermediate System to Intermediate System (IS-IS) Router Capability TLV of Type 242 that includes a SR capabilities sub-TLV of sub-Type 2.

In a fifth implementation form of the computer-implemented method or the Proxy Forwarding node according to the first or second aspect, when the Proxy Forwarding node supports SR proxy forwarding for only some of its neighboring nodes, the Proxy Forwarding node advertises the node-SID of each of the neighboring nodes as a proxy node-SID in an IS-IS SID/Label Binding TLV, indicating that it is able to do SR proxy forwarding for the neighboring node corresponding to the node-SID.

In a sixth implementation form of the computer-implemented method or the Proxy Forwarding node according to the first or second aspect, the Proxy Forwarding node is further configured to build an independent proxy forwarding table for each neighboring node that the Proxy Forwarding node supports SR proxy forwarding.

In a seventh implementation form of the computer-implemented method or the Proxy Forwarding node according to the first or second aspect, the Proxy Forwarding node is further configured to maintain the independent proxy forwarding table for a neighboring node that fails for the extended period of time.

A third aspect relates to a computer-implemented method for enabling traffic to continue to be forwarded on a Segment Routing Traffic Engineering (SR-TE) path for an extended period of time after a failure of a node whose node-SID is in a segment list of the SR-TE paths without having to immediately modify the segment list used at an ingress node to the SR-TE path. The method receives a node-SID of a second network node that is originated and advertised by the second network node. The method determines whether a neighboring node of the second network node is capable of performing SR proxy forwarding for the second network node. The method sends traffic targeting the second network node to the second network node using the node-SID of the second network node when the second network node is operating normally. The method sends traffic targeting the second network node to the neighboring node of the second network node using a proxy node-SID of the second network node when the second network node fails.

A fourth aspect relates to a network node configured to enable traffic to continue to be forwarded on a Segment Routing Traffic Engineering (SR-TE) path for an extended period of time after a failure of a node whose node-SID is in a segment list of the SR-TE paths without having to immediately modify the segment list used at an ingress node to the SR-TE path. The network node includes a memory storing instructions, and a processor coupled to the memory, the processor configured to execute the instructions to cause the network node to receive a node-SID of a second network node that is originated and advertised by the second network node; determine whether a neighboring node of the second network node is capable of performing SR proxy forwarding for the second network node; send traffic targeting the second network node to the second network node using the node-SID of the second network node when the second network node is operating normally; and send traffic targeting the second network node to the neighboring node of the second network node using a proxy node-SID of the second network node when the second network node fails.

In a first implementation form of the computer-implemented method or the network node according to the third or fourth aspect, when the network node creates the proxy node-SID of the second network node for the neighboring node in response to a determination that the neighboring node is capable of doing SR proxy forwarding for the second network node.

In a second implementation form of the computer-implemented method or the network node according to the third or fourth aspect, the proxy node-SID of the second network node for the neighboring node is a copy of the node-SID of the second network node originated by the second network node mapped to the neighboring node.

In a third implementation form of the computer-implemented method or the network node according to the third or fourth aspect, the network node is further configured to obtain the proxy node-SID of a second network node that is originated and advertised by the neighboring node of the second network node.

In a fourth implementation form of the computer-implemented method or the network node according to the third or fourth aspect, the first network node is the ingress node to the SR-TE path.

The aforementioned aspects or implementations resolve the issue of traffic being dropped at a node because the node-SID of a failed node along a SR tunnel/path is deleted. In particular, the aforementioned aspects or implementations allow traffic to continue to be forwarded on an SR-TE path for an extended period of time after the failure of a node used in the path's segment list.

As referenced herein, an extended period of time is defined as a period of time after IGP converges following the failure of a node along a SR tunnel/path as described in the present disclosure. In some implementations, the extended period of time may be user-specified and modified as needed or desired.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a schematic diagram illustrating a Proxy SIDs TLV according to an embodiment of the present disclosure.

FIG. 5 is a schematic diagram illustrating a SID sub-TLV according to an embodiment of the present disclosure.

FIG. 6 is a schematic diagram illustrating a SID sub-TLV according to another embodiment of the present disclosure.

FIG. 7 is a schematic diagram illustrating an OSPFv2 Extended Prefix Opaque LSA according to an embodiment of the present disclosure.

FIG. 9 is a schematic diagram illustrating a SR Capabilities sub-TLV according to another embodiment of the present disclosure.

FIG. 10 is a schematic diagram illustrating a Flags field according to an embodiment of the present disclosure.

FIG. 11 is a schematic diagram illustrating a SR Binding TLV according to an embodiment of the present disclosure.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure describes various embodiments that allow traffic to continue to be forwarded on an SR-TE path for an extended period of time after the failure of a node used in the path's segment list. In an embodiment, when a node in a network fails, the ingress node of a SR tunnel/path going through the failed node will continue sending the traffic along the SR path for a given time. When the traffic reaches the neighbor node of the failed node, the neighbor node acting as a forwarding proxy of the failed node sends the traffic to the destination around the failed node. To perform the above actions, the disclosed embodiments describe various extensions to any link-state IGP, such as the Open Shortest Path First (OSPF) routing protocol and to the Intermediate System to Intermediate System (IS-IS) routing protocol. The disclosed extensions to OSPF and IS-IS include a Proxy SIDs Type Length Value (TLV), SR Proxy Forwarding Capability, and SR Binding. The disclosed embodiments can be deployed in any router, switch, and controller, which are used by service providers around the world.

Figure 1:
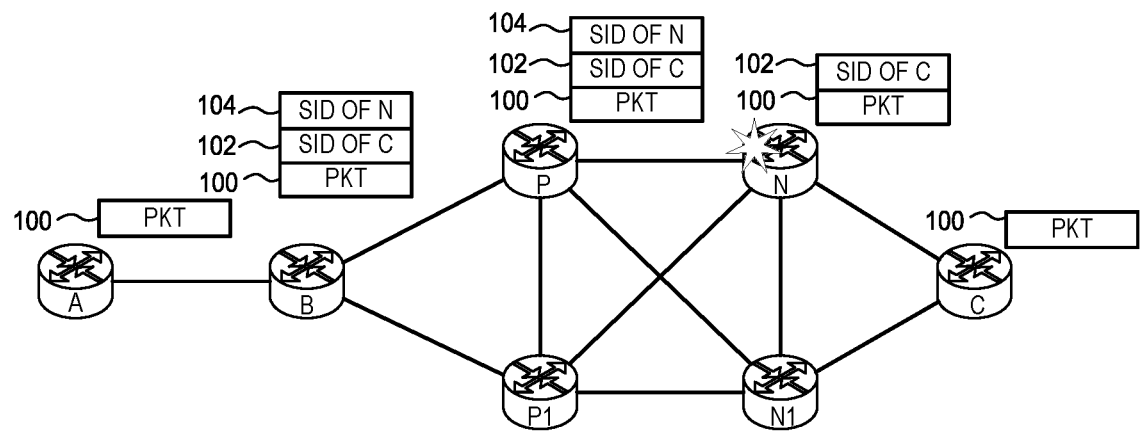
FIG. 1 is a schematic diagram illustrating a network according to an embodiment of the present disclosure.

FIG. 1 is a schematic diagram illustrating a network according to an embodiment of the present disclosure. The network includes node A, node B, node P, node P1, node N, node N1, and node C. In the depicted embodiment, node A sends a packet 100 destined to a node C. In a normal operating condition, node B, as ingress of SR-TE path (node B→node N→node C), receives the packet 100 from node A, and then adds a segment list of the SR-TE paths comprising the SID 104 of node N and the SID 102 of node C into the packet 100. Node B then sends the packet 100 with the SID 104 of node N and the SID 102 of node C to node P. Node P forwards the packet 100 with the SID 104 of node N and the SID 102 of node C to node N. Node N removes its SID 104 from the segment list of the packet 100. Node N sends the packet 100 with the segment list containing just the SID 102 of node C to node C, which removes its SID 102 from the segment list and obtains the packet 100.

In FIG. 1, assume that node N fails (e.g., link failure or node failure). Currently, when node N fails, its immediate neighbor (e.g., node P) detects the failure of node N. Node P as a Point of Local Repair (PLR) node performs a fast-reroute (FRR) protection until the IGP converges. IGP converges when all components of the router, including the Routing Information Base (RIB) and Forwarding Information Base (FIB), along with software and hardware tables, are provided with the most recent route change(s) such that forwarding for a route entry is successful on the Next-Best Egress Interface. The Next-Best Egress Interface is the outbound interface or set of outbound interfaces in an Equal Cost Multipath (ECMP) set or parallel link set of the Device Under Test (DUT) for traffic routed to the second-best next-hop.

The ingress node (e.g., node B) of the SR-TE path going through node N (i.e., the SID of node N is in the segment list of a packet imported into the SR tunnel/path) to a destination (e.g., node C) deletes the route to node N. In this case, the traffic to be transported by the SR tunnel/path cannot reach to the neighbor node of node N because the forwarding entry is deleted. Any traffic that arrives at node B with the node-SID of the failed node (i.e., node N) as the active segment will be dropped. Any traffic protection mechanism on the neighbor node of node N (e.g., node P) is not used to send the traffic for the SR tunnel/path around the failed node N towards its destination. Therefore, traffic along the route drops.

Afterwards, node A or a controller computes a new SR-TE path from node B to node C (e.g., B→N1→C), sends the new SR-TE path comprising a list of SIDs such as SID of N1 and SID of C to node B. Node B installs the SR-TE path, and then traffic recovers. The traffic from node A to node C then goes from node B to node N1 via node P1, and then to node C.

The disclosed embodiments provide an efficient solution for resolving the issue of traffic being dropped at a node because the node-SID of a failed node along a SR tunnel/path is deleted. In an embodiment, each neighbor node of the failed node advertises its SR proxy forwarding capability. This indicates that the neighbor node (referred to herein as the Proxy Forwarder or Proxy Forwarding Node) has the capability to do a SR proxy forwarding for all or some of its neighboring nodes and will forward traffic on behalf of those neighboring nodes if a failure occurs. For example, in FIG. 1, the neighbor node P of node N distributes the SID of node N as a proxy SID of node N to indicate that node P will forward traffic on behalf of the failed node N. Any node X/router including the ingress node of the SR tunnel/path going through node N (e.g., node B in FIG. 1) that receives the SR Proxy Forwarding capability from neighbors of a failed node (e.g., node P of failed node N), creates/derives and maintains the proxy SID of node N for node P, and sends traffic for the SR tunnel/path using the node-SID of node N (i.e., the failed node) to the nearest Proxy Forwarder (e.g., node P) after node N fails. Node P forwards the traffic for the SR tunnel/path around the failed node N and towards its destination. In an embodiment, once the affected traffic reaches a Proxy Forwarder, the Proxy Forwarder sends the traffic on the post-failure shortest path to the node immediately following the failed node in the segment list. The disclosed embodiments extend this traffic protection mechanism on the Proxy Forwarder until well after the IGP has converged.

Figure 2:
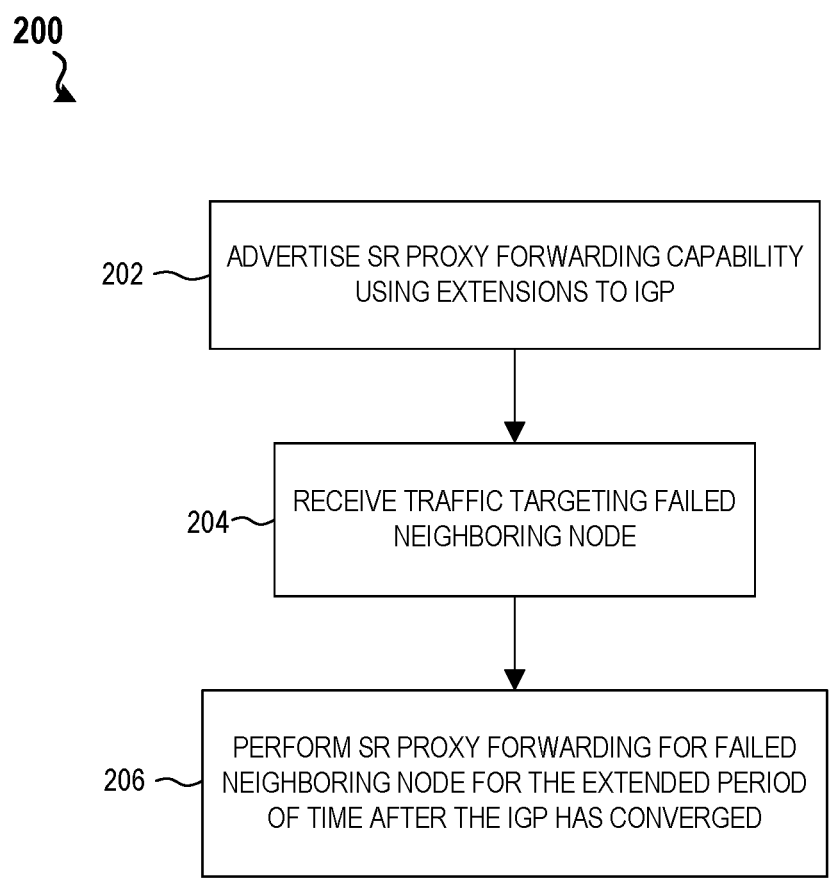
FIG. 2 is a flowchart illustrating a method performed by a neighboring node for enabling traffic to continue to be forwarded on an SR-TE path for an extended period of time after a failure of a node according to an embodiment of the present disclosure.

FIG. 2 is a flowchart illustrating a method 200 for enabling traffic to continue to be forwarded on an SR-TE path for an extended period of time after a failure of a node whose node-SID is in a segment list of the SR-TE paths without having to immediately modify the segment list used at an ingress node to the SR-TE path. The method 200 can be performed by a Proxy Forwarding node of a failed neighboring node. For example, in FIG. 1, node P can be a Proxy Forwarding node for node N in the event that node N fails. The method 200 begins, at step 202, by advertising, by the Proxy Forwarding node, SR proxy forwarding capability of the Proxy Forwarding node for neighboring nodes of the Proxy Forwarding node using extensions to IGP for Proxy Forwarding. Example extensions to IGP for Proxy Forwarding can include extensions to any link-state IGP, such as the OSPF routing protocol and to the IS-IS routing protocol.

Figure 8:
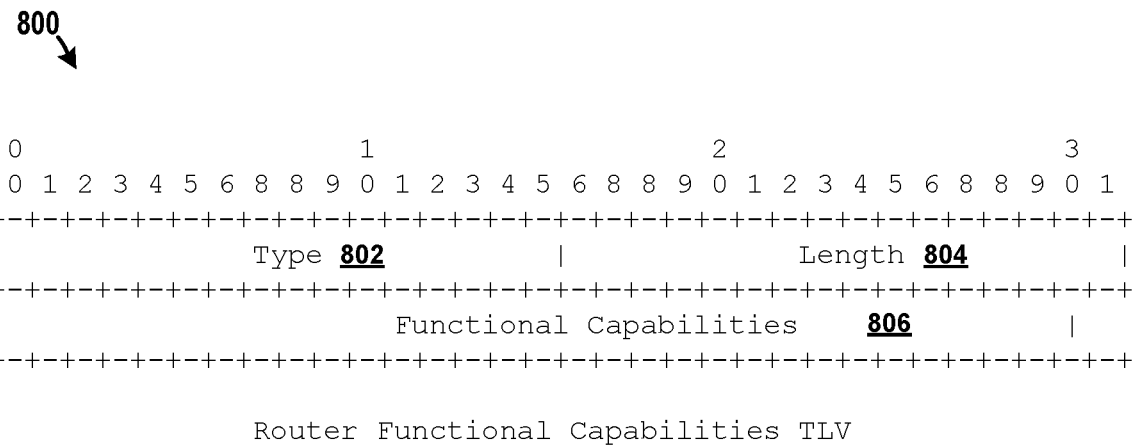
FIG. 8 is a schematic diagram illustrating a Router Functional Capabilities TLV according to an embodiment of the present disclosure.

For instance, in an embodiment, for OSPF, when the Proxy Forwarding node supports SR proxy forwarding for all its neighboring nodes, the Proxy Forwarding node advertises its SR proxy forwarding capability in an OSPF Router Information Opaque Link State Advertisement (LSA) that includes a Router Functional Capabilities TLV (FIG. 8). As will be further described, the Router Functional Capabilities TLV can include a bit that can be set to indicate that the Proxy Forwarding node is capable of doing a SR proxy forwarding for its neighboring nodes. In an embodiment, for OSPF, when the Proxy Forwarding node supports SR proxy forwarding for only some of its neighboring nodes, the Proxy Forwarding node advertises its SR proxy forwarding capability in an OSPF Extended Prefix Opaque LSA (FIG. 7) that includes a Proxy SIDs TLV (FIG. 4) specifying the proxy node-SID of each of the neighboring nodes that the node P supports SR proxy forwarding. In an embodiment, for OSPF, the Proxy Forwarding node creates the corresponding proxy forwarding entries for protecting the failure of the neighboring nodes that the Proxy Forwarding node provides SR proxy forwarding. When a neighboring node fails, the Proxy Forwarding node maintains, for the extended period of time (e.g., 30 minutes or any other given time period), the OSPF Extended Prefix Opaque LSA that includes the Proxy SIDs TLV specifying the proxy node-SID of each of the neighboring nodes including the failed neighboring node that the Proxy Forwarding node supports SR proxy forwarding. After the extended period of time has elapsed, the Proxy Forwarding node removes the Proxy SIDs TLV specifying the proxy node-SID of the neighboring node that failed from the OSPF Extended Prefix Opaque LSA, and then removes the corresponding proxy forwarding entries for protecting the failure of the neighboring node.

In an embodiment, for IS-IS, when the Proxy Forwarding node supports SR proxy forwarding for all its neighboring nodes, the Proxy Forwarding node advertises its SR proxy forwarding capability in its link state packet (LSP), which contains an IS-IS Router Capability TLV of Type 242 that includes a SR capabilities sub-TLV of sub-Type 2. The SR capabilities sub-TLV can include a flags field with a bit that can be used to indicate SR proxy forwarding capability of the Proxy Forwarding node. In an embodiment, for IS-IS, when the Proxy Forwarding node supports SR proxy forwarding for only some of its neighboring nodes, the Proxy Forwarding node advertises the node-SID of each of the neighboring nodes as a proxy node-SID in an IS-IS SID/Label Binding TLV, indicating that it is able to do SR proxy forwarding for the neighboring node corresponding to the node-SID.

At step 204, when a neighboring node fails, the method 200 receives, at the Proxy Forwarding node, traffic targeting the failed neighboring node of the Proxy Forwarding node. The traffic is sent using a proxy node-SID of the failed neighboring node. At step 206, method 200 performs, by the Proxy Forwarding node, SR proxy forwarding for the neighboring node by forwarding the traffic to a destination of the traffic without going through the neighboring node for the extended period of time after the IGP has converged. In an embodiment, the Proxy Forwarding node builds an independent proxy forwarding table for each neighboring node that the Proxy Forwarding node supports SR proxy forwarding. In an embodiment, the proxy forwarding table for a neighboring node (e.g., node N in FIG. 1) includes Node N's Segment Routing Global Block (SRGB) range and the difference between the SRGB start value of node P and that of node N. SRGB is a local property of a segment routing node. For example, in Multiprotocol Label Switching (MPLS), SRGB is the set of local labels reserved for assigning labels to global segments like Node-SIDs originated by a router. The proxy forwarding table for Node N also includes all adjacency-SID of node N and node-SID of the node pointed to by node N's adjacency-SID. The proxy forwarding table for node N further includes the binding-SID of node N and the label stack associated with the binding-SID of node N. In an embodiment, node N advertises to only its neighboring nodes a Binding Segment Opaque LSA (FIG. 12) containing a binding segment comprising a binding SID and a list of segments for supporting binding SID proxy forwarding. In an embodiment, the Binding Segment Opaque LSA is a link local scope LSA (i.e., LS Type 9 for OSPFv2, and LS Type TBD for OSPFv3). The Proxy Forwarding node (e.g., Node P for Node N in FIG. 1) uses a proxy forwarding table based on the next segment to find a node N as a backup forwarding entry to the adj-SID and Node-SID of node N. When node N fails, the proxy forwarding table is maintained for a specified period of time. The proxy forwarding table can be maintained for any specified time period. In an embodiment, the proxy forwarding table is maintained for 30 minutes.

Figure 3:
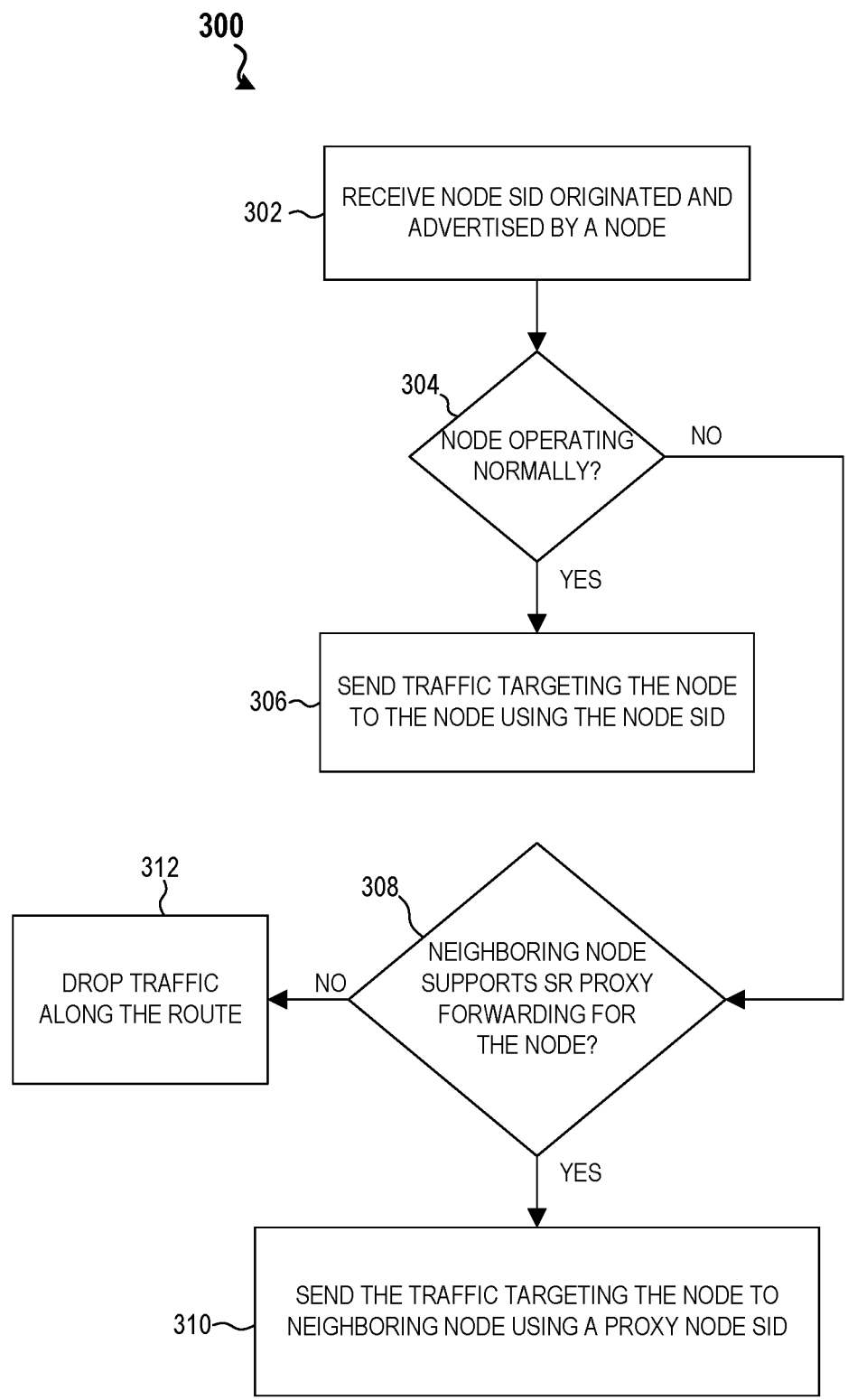
FIG. 3 is a flowchart illustrating a method performed by a node for enabling traffic to continue to be forwarded on an SR-TE path for an extended period of time after a failure of the node according to an embodiment of the present disclosure.

FIG. 3 is a flowchart illustrating a method 300 for enabling traffic to continue to be forwarded on an SR-TE path for an extended period of time after a failure of a node whose node-SID is in a segment list of the SR-TE paths without having to immediately modify the segment list used at an ingress node to the SR-TE path. The method 300 can be performed by any network node along the path of the traffic. For example, in reference to FIG. 1, the method 300 can be performed by Node B for enabling traffic to continue to be forwarded on the SR-TE path (node B→node N→node C) for an extended period of time after a failure of a node N. The method 300 begins, at step 302, by receiving at a first network node (e.g., node B), a node-SID of a second network node (e.g., node N) that is originated and advertised by the second network node. At step 304, a determination is made as to whether the second network node is operating normally. If the second network node is operating normally, at step 306, traffic targeting the second network node is sent to the second network node using the node-SID of the second network node that is originated and advertised by the second network node. However, if the second network node has failed (i.e., is not operating normally), at step 308, a determination is made as to whether a neighboring node of the second network node (e.g., node P of node N in FIG. 1) supports SR proxy forwarding for the second network node. If the neighboring node supports SR proxy forwarding for the second network node, at step 310, traffic targeting the second network node is sent to the neighboring node of the second network node (e.g., node P) using a proxy node-SID of the second network node. The neighboring node of the second network node performs SR proxy forwarding of the traffic for the failed second network node as described in FIG. 2. If at step 308, a determination is made that the neighboring node of the second network node does not support SR proxy forwarding for the second network node, then when the second network node fails, the traffic along the route is dropped at step 312.

FIG. 4 is a schematic diagram illustrating a Proxy SIDs TLV 400 according to an embodiment of the present disclosure. As stated above, in an embodiment, the Proxy SIDs TLV 400 can be used to specify the proxy node-SID of each of the neighboring nodes that the Proxy Forwarding node supports SR proxy forwarding when the Proxy Forwarding node supports SR proxy forwarding for only some of its neighboring nodes. For OSPF, the Proxy SIDs TLV 400 can be included an OSPF Extended Prefix Opaque LSA (FIG. 7) that is sent by the Proxy Forwarding node to advertise SR proxy forwarding capability. The Proxy SIDs TLV 400 includes a Type field 402, a Length field 404, and a SID Sub-TLVs field 406. The value for the Type field 402 is to be assigned by Internet Assigned Numbers Authority (IANA). The Length field 404 specifies the total size of the SID Sub-TLVs field 406 included in the OSPF Proxy SIDs TLV. The SID Sub-TLVs field 406 contains a number of SID Sub-TLVs (FIG. 5 or FIG. 6) for specifying the proxy node-SID of each of the neighboring nodes that the Proxy Forwarding node supports SR proxy forwarding.

FIG. 5 is a schematic diagram illustrating a SID Sub-TLV 500 according to an embodiment of the present disclosure. A number of the SID Sub-TLV 500 can be included in the Proxy SIDs TLV 400, each used to specify the proxy node-SID of a neighboring node that the Proxy Forwarding node supports SR proxy forwarding when the Proxy Forwarding node supports SR proxy forwarding for only some of its neighboring nodes. The SID Sub-TLV 500 includes a Type field 502, a Length field 504, a Flags field 506, a Reserved field 508, a MT-ID field 510, an Algorithm field 512, and a SID/Index/Label field 514. In an embodiment, the value assigned to the Type field 502 is two (2). The Length field 504 is 7 or 8 octets, dependent on settings in the Flags field 506. The Flags field 506 can include several defined flags such as, but not limited to, NP-Flag for indicating whether to pop a SID before delivering packets to the node that advertised the SID, an M-Flag to indicate if a SID was advertised by a Segment Routing Mapping Server, and a V-Flag to indicate if a SID carries an absolute value or an index. In an embodiment, the Reserved field 508 is set to 0 on transmission and ignored on reception. The MT-ID field 510 contains a Multi-Topology Identifier as defined in RFC 4915. The Algorithm field 512 is a single octet identifying the algorithm the SID is associated with. The SID/Index/Label field 514 contains either a SID, an index defining the offset in the SID/Label space advertised by the router, or a local label where the 20 rightmost bits are used for encoding the label value.

FIG. 6 is a schematic diagram illustrating a SID Sub-TLV 600 according to another embodiment of the present disclosure. In an embodiment, the SID Sub-TLV 600 can be included in the Proxy SIDs TLV 400, each used to specify the proxy node-SID of a neighboring node that the Proxy Forwarding node supports SR proxy forwarding when the Proxy Forwarding node supports SR proxy forwarding for only some of its neighboring nodes. The SID Sub-TLV 600 is an optimized form of the SID Sub-TLV 500. The SID Sub-TLV 600 only includes a Type field 602, a Length field 604, and a SID/Index/Label field 606, as similarly described in FIG. 5.

FIG. 7 is a schematic diagram illustrating an OSPFv2 Extended Prefix Opaque LSA 700 according to an embodiment of the present disclosure. As stated above, in an embodiment, the OSPFv2 Extended Prefix Opaque LSA 700 can be used by a Proxy Forwarding node to advertise its SR proxy forwarding capability for neighboring nodes that the Proxy Forwarding node supports SR proxy forwarding. The OSPFv2 Extended Prefix Opaque LSA 700 includes a LS age field 702, an Options field 704, a LS Type field 706, an Opaque Type field 708, an Opaque ID field 710, an Advertising Router field 712, an LS sequence number field 714, a LS checksum field 716, a Length field 718, and a TLVs field 720.

The LS age field 702 contains the age of the OSPFv2 Extended Prefix Opaque LSA 700 advertisement in seconds to enable old advertisements to be flushed from the routing domain. The Options field 704 can be used to specify one or more OSPFv2 options. The Options field 704 enables OSPF routers to support (or not support) optional capabilities, and to communicate their capability level to other OSPF routers. The LS Type field 706 is used to indicate the flooding scope of the OSPFv2 Extended Prefix Opaque LSA 700 (e.g., area-local (10) or AS-wide (11)). The Opaque Type field 708 is used to differentiate the various types of OSPFv2 Opaque LSAs. The Opaque ID field 710 can contain an arbitrary value that is used to maintain or differentiate between multiple OSPFv2 Extended Prefix Opaque LSAs 700. The Advertising Router field 712 contains the router ID of the router that originated the OSPFv2 Extended Prefix Opaque LSA 700. The LS sequence number field 714 contains successive sequence numbers that is used to detect old or duplicate LSAs. The LS checksum field 716 contains a checksum of the complete contents of the OSPFv2 Extended Prefix Opaque LSA 700 including the LSA header, but excluding the LS age field 702. The Length field 718 represents the total length (in octets) of the OSPFv2 Extended Prefix Opaque LSA 700, including the LSA header and all TLVs (including padding). The TLVs field 720 contains the SID Sub-TLVs (e.g., SID Sub-TLV 500 or SID Sub-TLV 600) for each of the neighboring nodes after the Proxy Forwarding node creates the corresponding proxy forwarding entries for protecting the failure of the neighboring nodes.

FIG. 8 is a schematic diagram illustrating a Router Functional Capabilities TLV 800 according to an embodiment of the present disclosure. As stated above, in an embodiment, for OSPF, when the Proxy Forwarding node supports SR proxy forwarding for all of its neighboring nodes, the Proxy Forwarding node can advertise its SR proxy forwarding capability in an OSPF Router Information Opaque LSA that includes the Router Functional Capabilities TLV 800. The OSPF Router Information Opaque LSA has the same format as the OSPFv2 Extended Prefix Opaque LSA 700 in FIG. 7. The Router Functional Capabilities TLV 800 includes a Type field 802, a Length field 804, and Functional Capabilities field 806. In an embodiment, for OSPF, the value of the Type field 802 is 2. The Length field 804 indicates the length of the Functional Capabilities field 806, which is 4. The Functional Capabilities field 806 contains a bit such as bit 31 that can be set to indicate that the Proxy Forwarding node is capable of doing a SR proxy forwarding for its neighboring nodes. In an embodiment, for IS-IS, the value of the Type field 802 is 242. The Length field 804 indicates the length of the Functional Capabilities field 806. The Functional Capabilities field 806 can contain a number of SR Capabilities sub-TLVs (FIG. 9) to specify the capabilities of the node.

FIG. 9 is a schematic diagram illustrating a SR Capabilities sub-TLV 900 according to an embodiment of the present disclosure. The SR Capabilities sub-TLV 900 can be included in a Router Functional Capabilities TLV (e.g., Router Functional Capabilities TLV 800) to specify a capability of a node. The SR Capabilities sub-TLV 900 includes a Type field 902, a Length field 904, a Flags field 906, a Range field 908, and a SID/Label Sub-TLV field 910. In an embodiment, the Type field 902 is of sub-type 2. The Length field 904 is variable to indicate length of SR Capabilities sub-TLV 900, excluding the Length field 904 and the Type field 902. The Flags field 906 is 1 octet and can be used to specify certain flags. An example of the Flags field 906 is shown in FIG. 10. One or more segment routing global block (SRGB) descriptor entries are specified using the Range field 908 and a SID/Label Sub-TLV field 910. SRGB is the range of label values reserved for Segment Routing (SR) in a Label Switching Database (LSD). The SID/Label Sub-TLV field 910 contains the first value of the SRGB, while the Range field 908 contains the number of SRGB elements.

FIG. 10 is a schematic diagram illustrating a Flags field 1000 according to an embodiment of the present disclosure. The Flags field 1000 can be the Flags field 906 in the SR Capabilities sub-TLV 900. In the depicted embodiment, the Flags field 1000 includes an I-flag 1002, V-Flag 1004, and PF-flag 1006. The I-flag 1002 or MPLS Internet Protocol version 4 (IPv4) flag is used to indicate whether the router is capable of processing SR MPLS encapsulated IPv4 packets on all interfaces. The V-Flag 1004 or MPLS Internet Protocol version 6 (IPv6) flag is used to indicate whether the router is capable of processing SR MPLS encapsulated IPv6 packets on all interfaces. The PF-flag 1006 or PF bit is used to indicate whether the router has SR proxy forwarding capability. In one embodiment, when this bit is set to one (1) by a node, it indicates that the node is capable of doing a SR proxy forwarding for its neighboring nodes.

FIG. 11 is a schematic diagram illustrating a SR Binding TLV 1100 according to an embodiment of the present disclosure. The SR Binding TLV 1100 is used by a node to advertise to only its neighboring nodes a binding SID. The SR Binding TLV 1100 includes a Type field 1102, a Length field 1104, a Binding SID TLV field 1106, and a SID Sub-TLVs field 1108. In an embodiment, the Type field 1102 is 1 octet. The value of the Type field 1102 is to be assigned by IANA. The Length field 1104 is 1 octet. The value of the Length field 1104 is the length of Binding SID TLV plus the length of Sub-TLVs. The Binding SID TLV field 1106 contains a binding SID. The binding SID can be used by a node for steering traffic into the appropriate TE path to enforce TE policies. The SID Sub-TLVs field 1108 contains a number of SID sub-TLVs representing a list of segments. Each SID sub-TLV contains a segment (SID). In an embodiment, both Binding SID TLV and SID sub-TLV in the SR Binding TLV 1100 have the same format as a SID Sub-TLV as described in FIG. 5 or FIG. 6.

Figure 12:
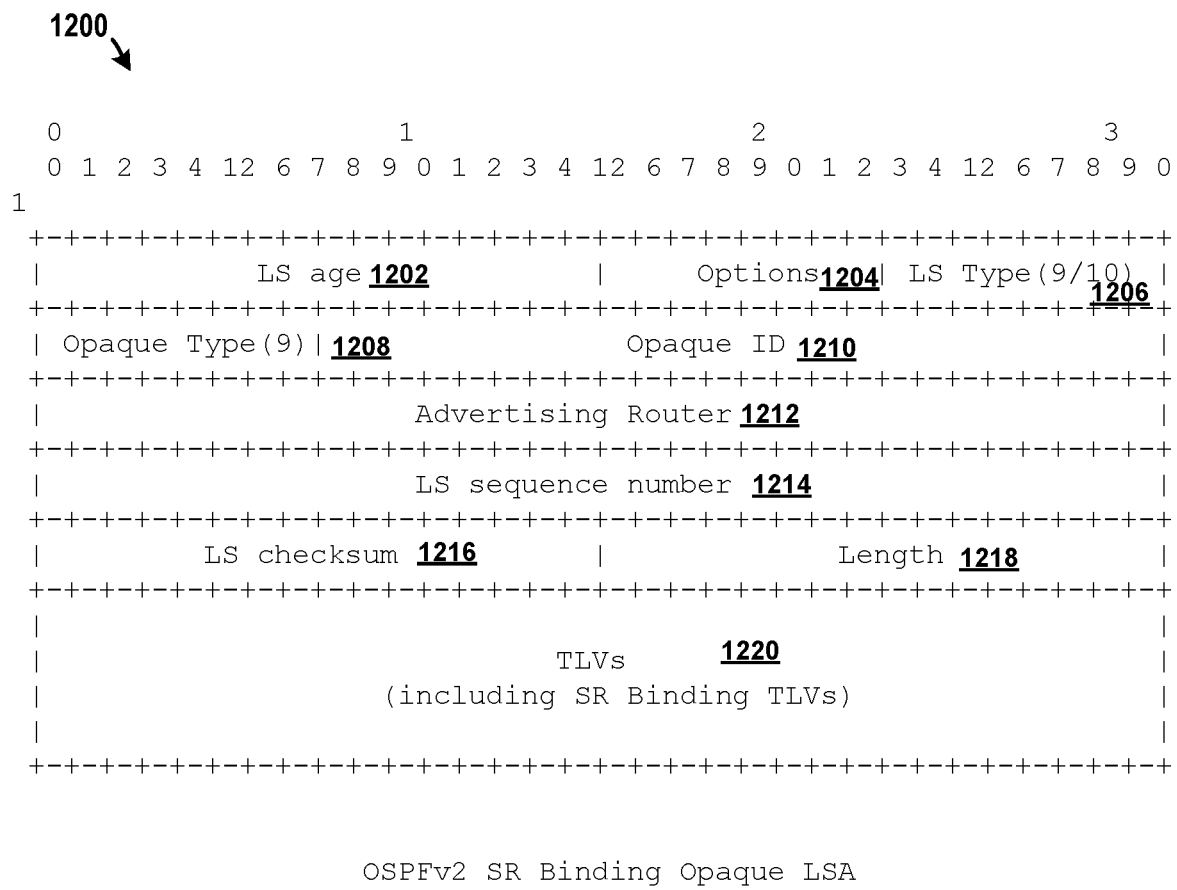
FIG. 12 is a schematic diagram illustrating an OSPFv2 SR Binding Opaque LSA according to an embodiment of the present disclosure.

FIG. 12 is a schematic diagram illustrating an OSPFv2 Binding Segment Opaque LSA 1200 according to an embodiment of the present disclosure. In an embodiment, the OSPFv2 Binding Segment Opaque LSA 1200 is used by a node to advertise to only its neighboring nodes a list of segments. The OSPFv2 Binding Segment Opaque LSA 1200 includes a LS age field 1202, an Options field 1204, a LS Type field 1206, an Opaque Type field 1208, an Opaque ID field 1210, an Advertising Router field 1212, an LS sequence number field 1214, a LS checksum field 1216, a Length field 1218, and a Binding Segment TLVs field 1220.

The LS age field 1202 contains the age of the OSPFv2 Binding Segment Opaque LSA 1200 advertisement in seconds to enable old advertisements to be flushed from the routing domain. The Options field 1204 can be used to specify one or more OSPFv2 options. The Options field 1204 enables OSPF routers to support (or not support) optional capabilities, and to communicate their capability level to other OSPF routers. In an embodiment, the LS Type field 1206 is of type nine (9). The Opaque Type field 1208 is used to differentiate the various types of OSPFv2 Opaque LSAs. The Opaque Type field 1208 may have Opaque Type of x (the exact type is to be assigned by IANA) for Binding Segment Opaque LSA. The Opaque ID field 1210 can contain an arbitrary value that is used to maintain or differentiate between multiple OSPFv2 Binding Segment Opaque LSAs 1200. The Advertising Router field 1212 contains the router ID of the router that originated the OSPFv2 Binding Segment Opaque LSA 1200. The LS sequence number field 1214 contains successive sequence numbers that is used to detect old or duplicate LSAs. The LS checksum field 1216 contains a checksum of the complete contents of the OSPFv2 Binding Segment Opaque LSA 1200 including the LSA header, but excluding the LS age field 1202. The Length field 1218 represents the total length (in octets) of the OSPFv2 Binding Segment Opaque LSA 1200, including the LSA header and all TLVs (including padding). The Binding Segment TLVs field 1220 contains a binding segment TLV for every binding on the node that advertises the OSPFv2 Binding Segment Opaque LSA 1200.

Figure 13:
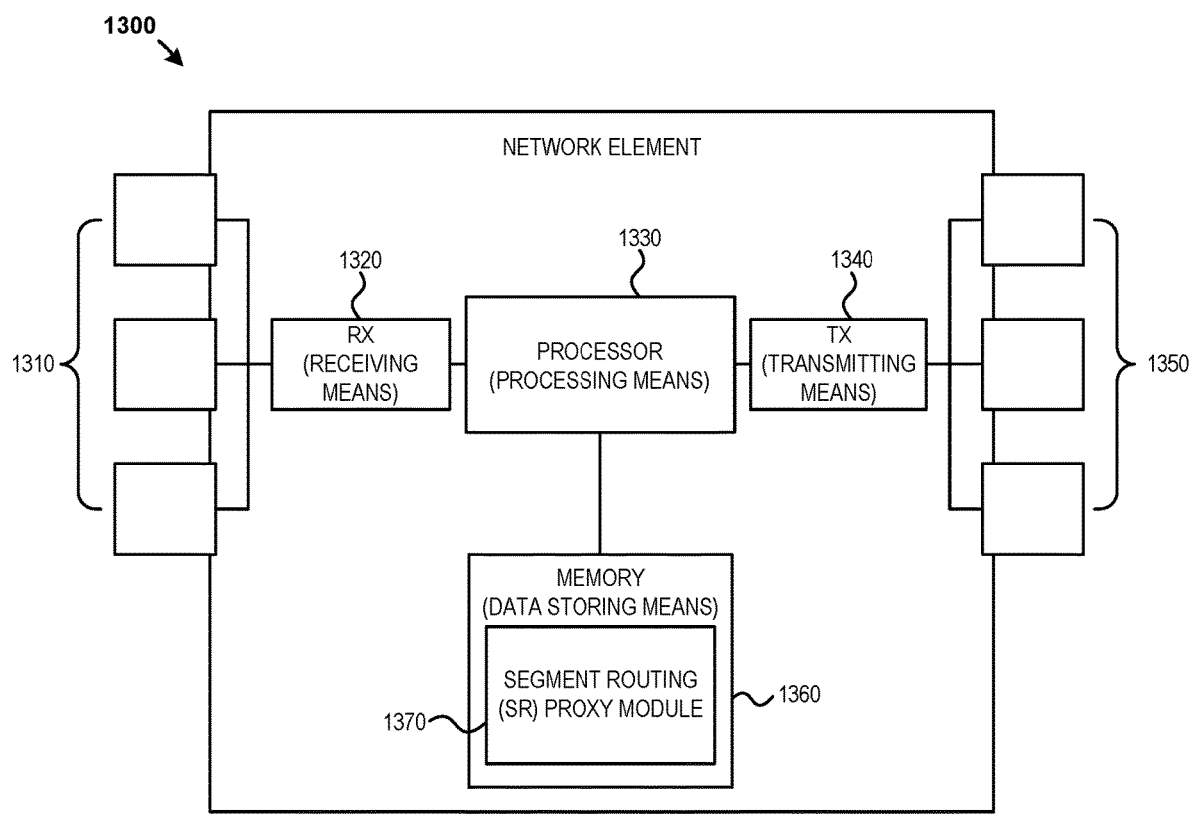
FIG. 13 is a schematic diagram illustrating a network element according to an embodiment of the present disclosure.

FIG. 13 is a schematic diagram illustrating a network element 1300 according to an embodiment of the present disclosure. The network element 1300 can be any type of network node, controller, router, and switch such as, but not limited to, node P and node N in FIG. 1. The network element 1300 includes receiver units (RX) 1320 or receiving means for receiving data via ingress ports 1310. The network element 1300 also includes transmitter units (TX) 1340 or transmitting means for transmitting via data egress ports 1350.

The network element 1300 includes a memory 1360 or data storing means for storing the instructions and various data. The memory 1360 can be any type of or combination of memory components capable of storing data and/or instructions. For example, the memory 1360 can include volatile and/or non-volatile memory such as read-only memory (ROM), random access memory (RAM), ternary content-addressable memory (TCAM), and/or static random-access memory (SRAM). The memory 1360 can also include one or more disks, tape drives, and solid-state drives. In some embodiments, the memory 1360 can be used as an over-flow data storage device to store programs when such programs are selected for execution, and to store instructions and data that are read during program execution.

The network element 1300 has one or more processor 1330 or other processing means (e.g., central processing unit (CPU)) to process instructions. The processor 1330 may be implemented as one or more CPU chips, cores (e.g., as a multi-core processor), field-programmable gate arrays (FP- GAs), application specific integrated circuits (ASICs), and digital signal processors (DSPs). The processor 1330 is communicatively coupled via a system bus with the ingress ports 1310, RX 1320, TX 1340, egress ports 1350, and memory 1360. The processor 1330 can be configured to execute instructions stored in the memory 1360. Thus, the processor 1330 provides a means for performing any computational, comparison, determination, initiation, configuration, or any other action corresponding to the claims when the appropriate instruction is executed by the processor. In some embodiments, the memory 1360 can be memory that is integrated with the processor 1330.

In one embodiment, the memory 1360 stores a SR Proxy Module 1370. The SR Proxy Module 1370 includes data and executable instructions for implementing the disclosed embodiments. For instance, the SR Proxy Module 1370 can include instructions for implementing the methods described in FIG. 2 and FIG. 3 described herein. The inclusion of the SR Proxy Module 1370 substantially improves the functionality of the network element 1300 by enabling traffic to continue to be forwarded on an SR-TE path for an extended period of time after a failure of a node whose node-SID is in a segment list of the SR-TE paths without having to immediately modify the segment list used at an ingress node to the SR-TE path.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Following the claims below is a document that may be submitted to a standards body and which embodies the present disclosure.

The invention claimed is:

1. A method implemented by a Proxy Forwarding node for forwarding traffic on a Segment Routing (SR) Traffic Engineering (SR-TE) path, the method comprising:
    obtaining SR proxy forwarding information from neighboring nodes of the Proxy Forwarding node for which the Proxy Forwarding node provides SR proxy forwarding, wherein the SR proxy forwarding information comprises a binding-segment identifier (SID) of at least one of the neighboring nodes and a label stack associated with the binding-SID;
    creating a proxy forwarding table for each of the neighboring nodes based on the SR proxy forwarding information;
    advertising SR proxy forwarding capability of the Proxy Forwarding node for the neighboring nodes of the Proxy Forwarding node using extensions to Interior Gateway Protocol (IGP);
    determining that a neighboring node along the SR-TE path for which the Proxy Forwarding node provides SR proxy forwarding has failed;
    receiving traffic targeting the failed neighboring node of the Proxy Forwarding node, the traffic including a node segment identifier (SID) of the failed neighboring node; and
    forwarding, based on the proxy forwarding table of the failed neighboring node, the traffic towards a destination of the traffic in a direction that avoids the failed neighboring node.

2. The method of claim 1, wherein the Proxy Forwarding node advertises the SR proxy forwarding capability in an Open Shortest Path First (OSPF) Router Information Opaque Link State Advertisement (LSA) that includes a Router Functional Capabilities Type Length Value (TLV).

3. The method of claim 1, wherein the Proxy Forwarding node advertises the SR proxy forwarding capability in an Open Shortest Path First (OSPF) Extended Prefix Opaque Link State Advertisement (LSA) that includes a Proxy SIDs Type Length Value (TLV) specifying the node SID of each of the neighboring nodes for which the Proxy Forwarding node is configured to perform SR proxy forwarding.

4. The method of claim 3, further comprising:
    continuing to advertise the OSPF Extended Prefix Opaque LSA comprising the node SID of the failed neighboring node for an extended period of time after the IGP has converged;
    removing the Proxy SIDs TLV specifying the node SID of the failed neighboring node from the OSPF Extended Prefix Opaque LSA after the extended period of time has elapsed; and
    removing the proxy forwarding table of the failed neighboring node after the extended period of time has elapsed.

5. The method of claim 1, wherein the Proxy Forwarding node advertises the SR proxy forwarding capability in a link state packet (LSP) comprising an Intermediate System to Intermediate System (IS-IS) Router Capability Type Length Value (TLV) of Type 242 that includes a SR capabilities sub-TLV of sub-Type 2 when the Proxy Forwarding node is configured to perform SR proxy forwarding for all neighboring nodes.

6. The method of claim 1, wherein the Proxy Forwarding node advertises, in an Intermediate System to Intermediate System (IS-IS) SID/Label Binding Type Length Value (TLV), the node SID of each of the neighboring nodes for which the Proxy Forwarding node is configured to perform SR proxy forwarding.

7. A Proxy Forwarding node configured to enable traffic to be forwarded on a Segment Routing (SR) Traffic Engineering (SR-TE) path after interior gateway protocol (IGP) has converged for a neighboring node along the SR-TE path, the Proxy Forwarding node comprising:
    a memory storing instructions; and
    one or more processors coupled to the memory and configured to execute the instructions to cause the Proxy Forwarding node to:
        obtain SR proxy forwarding information from neighboring nodes of the Proxy Forwarding node for which the Proxy Forwarding node provides SR proxy forwarding, wherein the SR proxy forwarding information comprises a binding-segment identifier (SID) of at least one of the neighboring nodes and a label stack associated with the binding-SID;

create a proxy forwarding table for each of the neighboring nodes based on the SR proxy forwarding information;

advertise SR proxy forwarding capability of the Proxy Forwarding node for the neighboring nodes of the Proxy Forwarding node using extensions to Interior Gateway Protocol (IGP);

determine that a neighboring node along the SR-TE path for which the Proxy Forwarding node provides SR proxy forwarding has failed;

receive the traffic targeting the failed neighboring node, the traffic including a node segment identifier (SID) of the failed neighboring node; and forward the traffic, based on the proxy forwarding table of the failed neighboring node, towards a destination of the traffic in a direction that avoids the failed neighboring node.

8. The Proxy Forwarding node of claim 7, wherein the Proxy Forwarding node advertises the SR proxy forwarding capability in an Open Shortest Path First (OSPF) Router Information Opaque Link State Advertisement (LSA) that includes a Router Functional Capabilities Type Length Value (TLV) when the Proxy Forwarding node is configured to perform SR proxy forwarding for all neighboring nodes.

9. The Proxy Forwarding node of claim 7, wherein the Proxy Forwarding node advertises the SR proxy forwarding capability in an Open Shortest Path First (OSPF) Extended Prefix Opaque Link State Advertisement (LSA) that includes a Proxy SIDs Type Length Value (TLV) specifying the node SID of each of the neighboring nodes for which the Proxy Forwarding node is configured to perform SR proxy forwarding.

10. The Proxy Forwarding node of claim 9, wherein the processor is further configured to execute the instructions to cause the Proxy Forwarding node to:

continue to advertise the OSPF Extended Prefix Opaque LSA comprising the node SID of the failed neighboring node for an extended period of time after the IGP has converged;

remove the Proxy SIDs TLV specifying the node SID of the failed neighboring node from the OSPF Extended Prefix Opaque LSA after the extended period of time has elapsed; and remove the proxy forwarding table used for protecting the failed neighboring node after the extended period of time has elapsed.

11. The Proxy Forwarding node of claim 7, wherein the Proxy Forwarding node advertises the SR proxy forwarding capability in its link state packet (LSP), which contains an Intermediate System to Intermediate System (IS-IS) Router Capability Type Length Value (TLV) of Type 242 that includes a SR capabilities sub-TLV of sub-Type 2 when the Proxy Forwarding node is configured to perform SR proxy forwarding for all neighboring nodes.

12. The Proxy Forwarding node of claim 7, wherein the Proxy Forwarding node advertises, in an Intermediate System to Intermediate System (IS-IS) SID/Label Binding Type Length Value (TLV), the node SID of each neighboring node for which the Proxy Forwarding node is configured to perform SR proxy forwarding.

13. A computer program product comprising a non-transitory computer readable storage medium having computer readable program instructions stored thereon, the computer readable program instructions when executed by a processor of a device causes the device to:

obtain Segment Routing (SR) proxy forwarding information from neighboring nodes of a Proxy Forwarding node for which the Proxy Forwarding node provides SR proxy forwarding, wherein the SR proxy forwarding information comprises a binding-segment identifier (SID) of at least one of the neighboring nodes and a label stack associated with the binding-SID;

create a proxy forwarding table for each of the neighboring nodes based on the SR proxy forwarding information;

advertise Segment Routing (SR) proxy forwarding capability of the Proxy Forwarding node for the neighboring nodes of the Proxy Forwarding node using extensions to interior gateway protocol (IGP);

determine that a neighboring node along a SR-Traffic Engineering (SR-TE) path for which the Proxy Forwarding node provides SR proxy forwarding has failed;

receive traffic targeting the failed neighboring node of the Proxy Forwarding node, the traffic including a node segment identifier (SID) of the failed neighboring node; and forward, based on the proxy forwarding table of the failed neighboring node, the traffic towards a destination of the traffic in a direction that avoids the failed neighboring node.

14. The computer program product of claim 13, wherein the Proxy Forwarding node advertises the SR proxy forwarding capability in an Open Shortest Path First (OSPF) Router Information Opaque Link State Advertisement (LSA) that includes a Router Functional Capabilities Type Length Value (TLV).

15. The computer program product of claim 13, wherein the Proxy Forwarding node advertises the SR proxy forwarding capability in an Open Shortest Path First (OSPF) Extended Prefix Opaque Link State Advertisement (LSA) that includes a Proxy SIDs Type Length Value (TLV) specifying the node SID of each neighboring node for which the Proxy Forwarding node is configured to perform SR proxy forwarding.

16. The computer program product of claim 15, wherein the computer readable program instructions when executed by the processor of the device further causes the device to:

continue to advertise the OSPF Extended Prefix Opaque LSA comprising the node SID of the failed neighboring node for an extended period of time after the IGP has converged;

remove the Proxy SIDs TLV specifying the node SID of the failed neighboring node from the OSPF Extended Prefix Opaque LSA after the extended period of time has elapsed; and remove the proxy forwarding table of the failed neighboring node after the extended period of time has elapsed.

17. The computer program product of claim 13, wherein the Proxy Forwarding node advertises the SR proxy forwarding capability in a link state packet (LSP) comprising an Intermediate System to Intermediate System (IS-IS) Router Capability Type Length Value (TLV) of Type 242 that includes a SR capabilities sub-TLV of sub-Type 2 when the Proxy Forwarding node is configured to perform SR proxy forwarding for all neighboring nodes.

18. The computer program product of claim 13, wherein the Proxy Forwarding node advertises, in an Intermediate System to Intermediate System (IS-IS) SID/Label Binding Type Length Value (TLV), the node SID of each of the neighboring nodes for which the Proxy Forwarding node is configured to perform SR proxy forwarding.

\* \* \* \* \*